United States Patent
Bonte

(10) Patent No.: US 9,480,204 B2
(45) Date of Patent: Nov. 1, 2016

(54) BRAKE MECHANISM FOR AGRICULTURAL BALER

(71) Applicant: CNH Industrial America LLC, New Holland, PA (US)

(72) Inventor: Xavier Bonte, Et Sint Kruis (NL)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/912,000

(22) PCT Filed: Aug. 1, 2014

(86) PCT No.: PCT/EP2014/066598
§ 371 (c)(1),
(2) Date: Feb. 12, 2016

(87) PCT Pub. No.: WO2015/024761
PCT Pub. Date: Feb. 26, 2015

(65) Prior Publication Data
US 2016/0192593 A1    Jul. 7, 2016

(30) Foreign Application Priority Data

Aug. 20, 2013 (BE) .................................. 2013/0547

(51) Int. Cl.
*A01F 15/08* (2006.01)
*A01F 15/04* (2006.01)
*F16D 65/28* (2006.01)
(Continued)

(52) U.S. Cl.
CPC ............ *A01F 15/08* (2013.01); *A01F 15/042* (2013.01); *A01F 15/0841* (2013.01); *A01F 21/00* (2013.01); *B60T 11/16* (2013.01); *B60T 11/18* (2013.01); *F16D 65/12* (2013.01); *F16D 65/28* (2013.01); *F16D 2121/02* (2013.01); *F16D 2121/14* (2013.01); *F16D 2125/64* (2013.01)

(58) Field of Classification Search
CPC ...... A01F 15/08; A01F 15/042; A01F 15/06; A01F 15/1841; A01F 21/00; F16D 65/12; F16D 65/28; F16D 2121/02; F16D 2121/14; F16D 2125/64; B60T 13/161; B60T 13/162; B60T 13/165; B60T 13/166; B60T 13/248; B60T 7/08; B60T 11/16; B60T 11/18
USPC ................................... 100/179, 270; 56/341
See application file for complete search history.

(56) References Cited

U.S. PATENT DOCUMENTS 3,006,207 A    10/1961    Russell
3,334,577 A  *  8/1967    Majkrzak ................ A01F 15/04
                                                    100/19 R (Continued)

FOREIGN PATENT DOCUMENTS

EP     1522756 A1    4/2005
GB     1373824 A    11/1974

*Primary Examiner* — Jimmy T Nguyen
(74) *Attorney, Agent, or Firm* — Patrick M. Sheldrake

(57) ABSTRACT

A baler has a chamber, a plunger, wherein the plunger is connected to a plunger driving mechanism that is adapted to reciprocally move the plunger in the baling chamber, a hydraulic brake mechanism including a master cylinder, a brake cylinder and a lever, wherein the lever is provided to operate the master cylinder, which master cylinder is fluidly connected to the brake cylinder arranged to act on the plunger driving mechanism, wherein the hydraulic brake mechanism further includes a spring arranged between the lever and the master cylinder.

12 Claims, 3 Drawing Sheets

(51) Int. Cl.
*F16D 65/12* (2006.01)
*B60T 11/16* (2006.01)
*B60T 11/18* (2006.01)
*A01F 21/00* (2006.01)
*F16D 121/02* (2012.01)
*F16D 125/64* (2012.01)
*F16D 121/14* (2012.01)

(56) References Cited

U.S. PATENT DOCUMENTS

| | | |
|---|---|---|
| 3,866,721 A | 2/1975 | Pringle |
| 3,889,468 A * | 6/1975 | Blumer ............... B60T 13/165 60/548 |
| 5,699,884 A | 12/1997 | Koch et al. |
| 5,806,937 A * | 9/1998 | Brunson ............... B60T 7/20 188/34 |
| 6,192,685 B1 * | 2/2001 | Bourlon ............... B60T 7/04 60/566 |
| 6,796,407 B2 | 9/2004 | Buckley et al. |
| 7,464,526 B2 | 12/2008 | Coenen |
| 8,656,831 B2 | 2/2014 | Viaud et al. |
| 2012/0204742 A1 * | 8/2012 | Van Vooren ........ A01F 15/0841 100/349 |

* cited by examiner

BRAKE MECHANISM FOR AGRICULTURAL BALER

This application is the US National Stage filing of International Application Ser. No. PCT/EP2014/066598 filed on Aug. 1, 2014 which claims priority to Belgian Application BE2013/0547 filed Aug. 20, 2013, each of which is incorporated herein by reference in its entirety.

FIELD OF THE INVENTION

The present invention relates to an agricultural baler comprising a baling chamber and a plunger, wherein the plunger is connected to a plunger driving mechanism that is adapted to reciprocally move the plunger in the baling chamber, the baler further comprising pickup means for picking up crop material from a field and for transferring the crop material to the baling chamber so that the crop material can be compressed into the baling chamber via the reciprocally moving plunger. Particularly, the invention relates to an agricultural baler wherein a brake mechanism acts on the plunger driving mechanism, which brake mechanism is at least provided to operate as a parking brake. Thereby operating as a parking brake is defined as a brake adapted for maintaining a brake force on a standing-still element over a longer period of time. Such parking brake is most known to be applied to the wheels of a vehicle, but the invention relates to applying a parking brake to the plunger driving mechanism of the baler so that the standing-still position of the plunger can be guaranteed during maintenance.

BACKGROUND OF THE INVENTION

Plunger driving mechanisms for agricultural balers typically comprise a flywheel. Depending on the type of baler, this flywheel can have different dimensions. For example a large baler will have a substantially heavy flywheel where a small baler can be provided with a smaller flywheel. Existing flywheel parking brake mechanisms for agricultural balers comprise a belt that is guided over the flywheel, which belt is connected to the frame of the baler in a fixed position, and comprising tightening means that are provided to tighten, or loosen, the belt around the flywheel. Thereby, by tightening the belt (having a fixed position) around the flywheel, the friction between the flywheel (that rotates) and the belt (that is in a fixed position) increases, thereby stopping the rotation of the flywheel. By loosening the belt, the friction between the flywheel and the belt decreases so that the flywheel can rotate.

U.S. Pat. No. 3,006,207 discloses an agricultural baler having a braking mechanism acting on the drive train of the baler. A brake shoe engages the edge of the outer disc of the rear pulley.

An advantage of these existing parking brake mechanism is that the braking force can be exactly set at an optimal predetermined braking force. Furthermore, this predetermined braking force can be maintained over a long period of time (several days or several weeks). Thereby, the braking mechanism proves to be reliable as a parking brake, where a braking force must be maintained over a longer period of time without losing too much brake force. A further advantage of this braking mechanism is that it can be used to slow down a rotating plunger driving mechanism.

A drawback of the above known braking mechanism is that it is less wear resistant, and that frequent maintenance interventions are required to keep the braking mechanism reliable. A further drawback is that often the braking mechanism cannot be operated from a remote place.

US 2003/0106754 shows a hydraulic brake system for small utility and recreational vehicles which undergo frequently stopping, such as golf cars and the like, for which it is important to be capable of holding the vehicle in a stopped position when on an upwardly or downwardly inclined grade. The brake system has a hydraulic accumulator that stores much of the energy generated upon brake pedal depression and a booster that automatically boosts the energy storage capacity of the accumulator during the first braking cycles to compensate for e.g. volumetric changes in the system that might take place during prolonged periods of non-use under dropping-temperature conditions. The solution proposed in this document is however very complex and expensive.

SUMMARY OF THE INVENTION

It is an object of the invention to provide a reliable, wear resistant brake mechanism for an agricultural baler that is easy to use.

To this end, the agricultural baler of the invention further comprises a hydraulic brake mechanism comprising a master cylinder, a brake cylinder and a lever, wherein the lever is provided to operate the master cylinder, which master cylinder is fluidly connected to the brake cylinder that is arranged to act on the plunger driving mechanism for braking the latter, when the hydraulic brake mechanism further comprises an accumulator operationally integrated in the hydraulic brake mechanism for accumulating and storing mechanical energy in the hydraulic brake mechanism, the accumulator preferably being a spring arranged between the lever and the master cylinder to transmit a compression from the lever to the master cylinder.

Hydraulic brake mechanisms have been widely used, particularly as footbrake in commercial vehicles. Thereby the master cylinder is operated by a brake pedal, where the brake cylinder is arranged to act on a disc that is mounted on the shafts of the wheels. By pressing on the brake pedal, the master cylinder is compressed, and fluid is pressed from the master cylinder to the brake cylinder. In this manner, a motion and a force is transmitted from the master cylinder to the brake cylinder. Thereby, the transmitted force can be increased by dimensioning the brake cylinder diameter larger than the master cylinder diameter. Because of the hydraulic connection, there can be a distance between the master cylinder and the brake cylinder, which distance is then bridged by the fluid connection. This allows the brake cylinder to be remotely operated. However, directly applying such hydraulic brake mechanism to an agricultural baler for parking brake purposes would not be sufficient to meet the object of the invention. Namely, such agricultural baler with hydraulic system would not be able to maintain its brake power over time (over a days, over a week or over several weeks). This is a result of the tendency of a hydraulic system to leak fluid (although such leak is minimized, even a minimal leak will have significant effect over time). Such fluid leak is according to the invention countered by a spring that is arranged between the lever and the master cylinder. Because the spring is arranged between the lever and the master cylinder, when the lever is operated to act on the master cylinder, the spring is caught between the lever and the master cylinder. In this manner, the lever will transmit its force to the master cylinder via the spring. Since a spring has the capacity to store mechanical energy (the spring will generate a force even if it is somewhat released due to a movement of the master cylinder away from the lever), fluid leakage will not result in a loss of brake force. The result of fluid leakage is that the master cylinder tends to move away from the lever acting on it. This movement of the master cylinder away from the lever, is countered by the spring in the sense that the lever still applies a force to the master cylinder via the spring. Thereby, the brake force of the braking mechanism in the agricultural baler can be maintained over a long period of time, which allows the braking mechanism to be used as a parking brake.

Preferably the spring is connected to the lever. Connecting the spring to the lever allows to position the spring correctly with respect to the lever, and thereby also with respect to the master cylinder.

Preferably the lever comprises a compression pin via which the lever is provided to act on the master cylinder, wherein the compression pin is biased via said spring towards the master cylinder. Thereby, a pin is provided as part of the lever, which pin can slide along its longitudinal axis with respect to the lever. The pin is biased towards the master cylinder via the spring. When the lever is moved towards the master cylinder, the compression pin acts on the master, and the compression pin thereby slides against the spring tension (thereby mechanically storing energy). As a result, when over time the master cylinder tends to move away from the lever, the compression pin follows the movement of the master cylinder due to the spring force (delivering the mechanically stored energy). In this manner, pressure is maintained on the master cylinder over time.

Preferably the pin is slidable between a forward position and a backward position, wherein the spring is arranged to push the pin into the forward position. By arranging the spring to push the pin into the forward position, the pin is biased towards this forward position. Arranging a spring to push a pin in a predetermined direction is technically easy to accomplish and is reliable.

Preferably the lever comprises a handle and is operable between a retracted and an extended position. Via the handle, the hydraulic brake mechanism can be manually operated, and can be easily used as a parking brake. Thereby, the handle can be placed at substantially any place in the baler, since the master cylinder is fluidly connected to the brake cylinder. As a result the lever should not necessarily be placed near the braking location.

Preferably the compression pin is pressed against a master cylinder, thereby acting on the latter, when the lever is in the extended position. Thereby, the compression pin, which is biased towards the forward position, acts on the master cylinder when the lever is brought in the extended position. This allows the compression pin to buffer the force transmission between the lever and the master cylinder. It further allows the compression pin to release the energy that is mechanically stored in the spring, when the master cylinder moves away from the lever due to fluid leakage.

Preferably the spring is provided to be at least partially loaded by moving the lever from the retracted to the extended position, thereby pushing the pin against the spring tension, so that the pin is biased to press against the master cylinder in the extended position. By moving the lever from a first, retracted to a second extended position, the compression pin is arranged to contact the master cylinder somewhere in an intermediate position of the lever. When the lever is further moved from the intermediate to the extended position, the compression pin pushes against the master cylinder, thereby inducing two movements. A first movement is the movement of the master cylinder compressing the fluid and thereby performing the braking operation, and a second movement is the movement of the compression pin against the spring tension. Due to the second movement, the spring is at least partially loaded. The spring can be already somewhat preloaded, yet further movement of the compression pin against the spring tension will further load the spring. In this manner, the spring tension forms a mechanical buffer for buffering an energy that is to be applied to the master cylinder. Particularly when the master cylinder somewhat moves away from the lever due to fluid leakage over time, the compression pin follows this movement and keeps pressing against the master cylinder. In this manner, a braking force can be guaranteed over time, even in case of minimal fluid leakage.

Preferably, the compression pin is disengaged from the master cylinder when the lever is in the retracted position. By disengaging the compression pin from the master cylinder all external forces to the master cylinder are removed, and consequently no braking force is applied.

Preferably, the plunger driving mechanism comprises a disc, said brake cylinder being arranged in an engaging relationship with said disc, such that acting of the brake cylinder frictionally engages the brake cylinder with the disc. Disc brake systems having widely used, and known for their reliable and efficient operation. An advantage of disc braking systems is that heat generated as a result of the braking action can be easily transferred to the environment.

Preferably the plunger driving mechanism comprises a flywheel. A flywheel is used in agricultural balers to accumulate the continuous rotational power that is delivered by the tractor and to transfer the power to the intermitting compression system of the baler.

Preferably, the brake mechanism further comprises a conduit that extends between the master cylinder and the brake cylinder for fluidly connecting the latter. More preferably, a pressure vessel is connected to the master cylinder for preventing air to enter into the hydraulic system. A conduit proves to be an efficient manner for fluidly connecting the master cylinder with the brake cylinder, and for bridging the distance between the master and the brake cylinder.

Preferably, the brake cylinder has a diameter that is N times larger than a master cylinder diameter, wherein N is larger than 2. By providing the brake cylinder with a larger diameter than the master cylinder, a force that is applied to the master cylinder will be felt at the brake cylinder as a force that is N times larger. This working principle is known to the skilled person, and can be used to engineer a hydraulic brake mechanism with predetermined specifications.

The invention further relates to a hydraulic brake mechanism for an agricultural baler, the brake mechanism comprising a master cylinder, a brake cylinder and a lever, wherein the lever is provided to operate the master cylinder, which master cylinder is fluidly connected to the brake cylinder that is arranged to act on the plunger driving mechanism for braking the latter, wherein the hydraulic brake mechanism further comprises a spring arranged between the lever and the master cylinder to transmit a compression from the lever to the master cylinder. The effect and advantages that are described above in relation to the agricultural baler having the hydraulic brake mechanism, also apply to the hydraulic brake mechanism for an agricultural baler. Therefore, reference is made to the advantages and effects described above.

The invention further relates to a lever for operating a master cylinder in a hydraulic brake mechanism for an agricultural baler, the lever comprising a compression pin via which the lever is provided to act on the master cylinder, wherein the compression pin is biased via the pin towards the master cylinder. By mounting such a lever into an existing hydraulic brake mechanism, the above described advantages and effects can be obtained.

BRIEF DESCRIPTION OF THE DRAWINGS

The invention will now be described in more detail with respect to the drawings illustrating some preferred embodiments of the invention. In the drawings.

In the drawings a same reference number has been allocated to a same or analogue element.

DETAILED DESCRIPTION OF THE INVENTION

Figure 1:
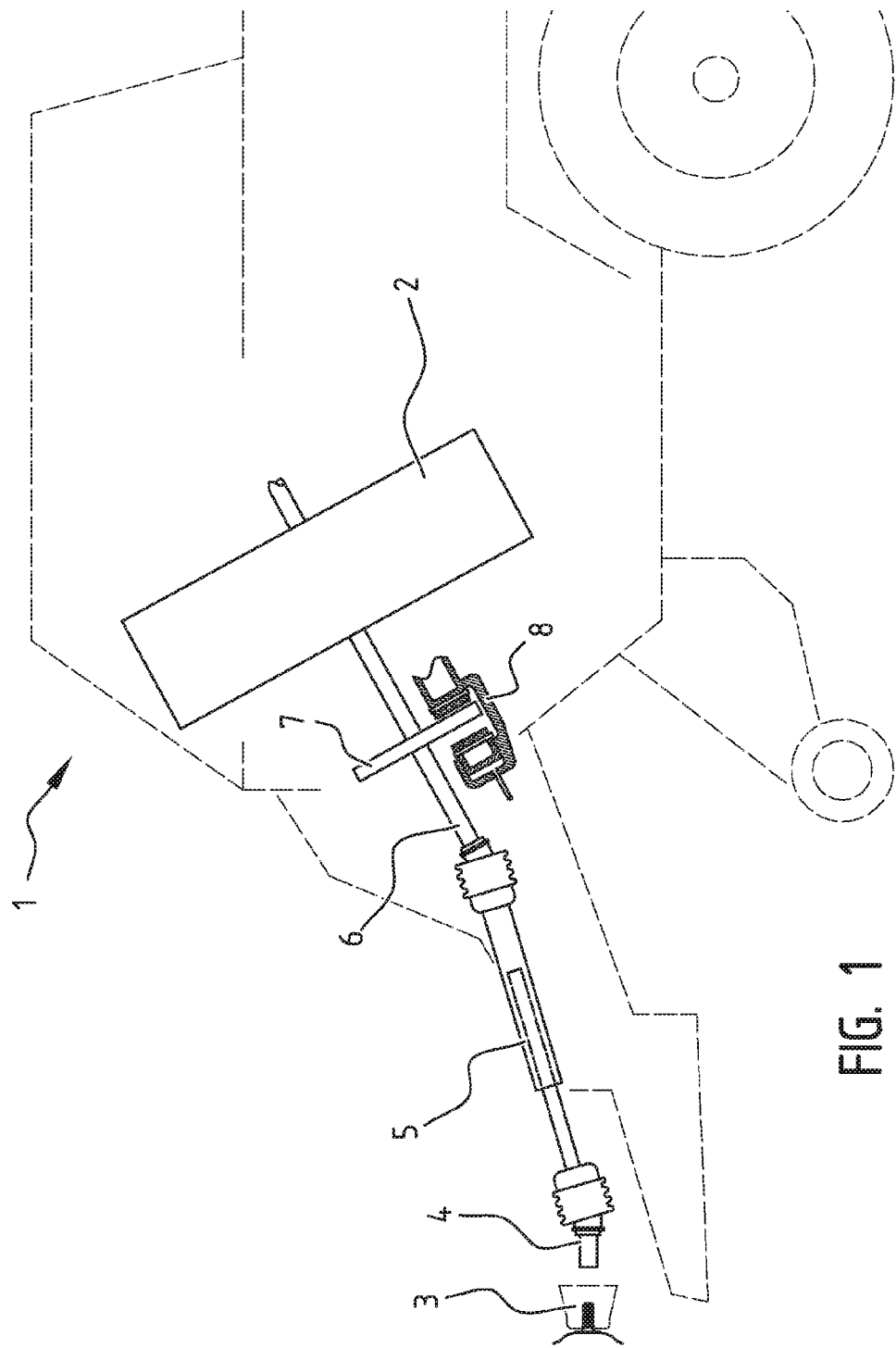
FIG. 1 schematically shows an agricultural baler having a plunger drive mechanism.

FIG. 1 shows an agricultural baler 1 in a schematic representation showing the elements of the agricultural baler that are of importance for the invention. Agricultural balers typically comprise a baling chamber defined by four baling chamber walls. A plunger is provided to reciprocally move between the four baling chamber walls. The agricultural baler further comprises pickup means for picking up crop material from a field, and for transferring the picked up crop material into the baling chamber. The reciprocal movement of the plunger will compress the crop material introduced in the baling chamber into a bale. Thereby, the density of the bale will depend on the forces used by the plunger to compress the crop material.

The plunger is driven by a plunger drive mechanism, which is shown in FIG. 1 in full lines (agricultural baler being shown in dotted lines). Such plunger drive mechanism is typically provided to be driven by a PTO 3 of a pulling tractor. The rotational movement of the PTO 3 is transferred to a PTO coupling element 4, through an assembly of shafts 5, 6 to a flywheel 2. At the other side of the flywheel a gearbox is provided to connect the plunger to the flywheel. This gear box (not shown) converts the rotational movement of the flywheel into a reciprocal movement of the plunger.

The flywheel 2 is intended to have a high inertia, for transferring the continuous rotational power delivered by the PTO into an intermitting power usage of the plunger. To this end, the flywheel 2 is designed to be large, having a high weight. In a situation where the agricultural baler is stopped, the flywheel tends to rotate further for a significantly long time, due to its weight and inertia. This can lead to dangerous situations, for example when an operator stops the agricultural baler to do some maintenance. Therefore a braking mechanism 8 is arranged to act on an element 7 of the plunger drive mechanism, so that the rotation of the plunger drive mechanism can be stopped via the brake mechanism 8. While FIG. 1 shows how the brake mechanism 8 acts on an element 7 that is specifically intended for this purpose (a brake disc), it will be clear that the brake mechanism can alternatively be arranged to act on an existing element of the plunger drive mechanism, for example on the flywheel. The brake mechanism 8 is not limited to a disk brake system, and can be formed as any system where a frictional engagement between a brake element and a plunger drive mechanism element can be set.

Figure 2:
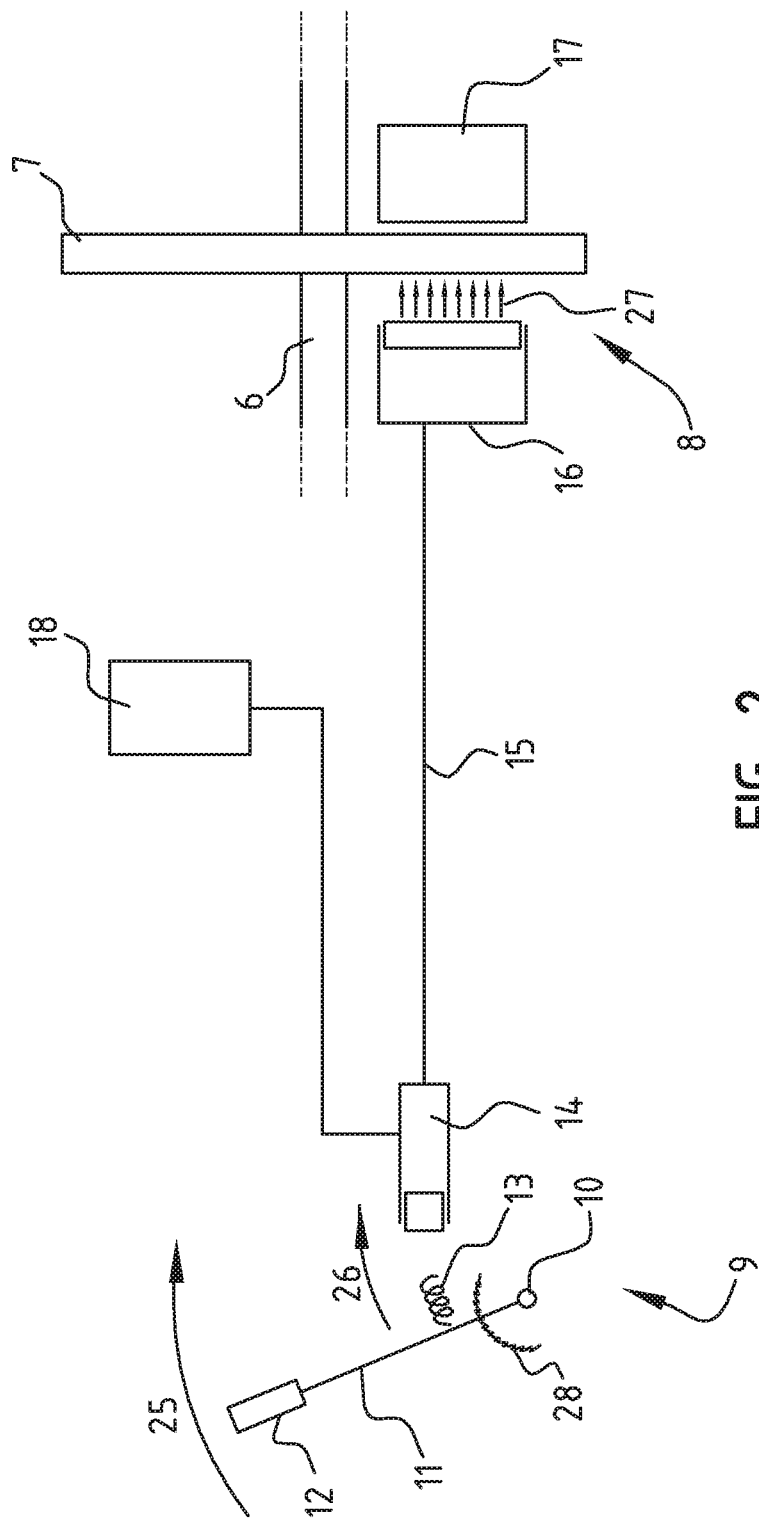
FIG. 2 shows a schematic overview of a brake mechanism according to an embodiment of the invention.

FIG. 2 shows a schematic representation of a brake system that is arranged to act on element 7 of the plunger drive mechanism. The main component of the brake mechanism will be described in more detail hereunder and comprise a lever 9, a master cylinder 14, and a brake cylinder 16. Thereby the lever 9 is provided to act on the master cylinder 14 via a spring 13. The master cylinder 14 is fluidly connected 15 to the brake cylinder 16, to transmit a force from the master cylinder 14 to the brake cylinder 16. The brake cylinder 16 is arranged in an engaging relationship with the element 7 of the plunger drive mechanism, so that the brake cylinder 16 can frictionally engage with the element 7 to apply a braking force to the plunger drive mechanism.

The lever 9 can be formed in a conventional manner. In the example of the FIG. 2 the lever comprises a rod 11 that is pivotally connected with respect to a pivot point 10 at one end of the rod 11, and comprises a handle 12 at another end of the rod. Via the handle 12, the lever can be operated by an operator. The rod 11 preferably cooperates with a ratchet mechanism that allows to pivot the lever in only one direction, by preventing pivoting the lever in the opposite direction. In FIG. 2, the ratchet is schematically visualised by element 28. The lever 9 further comprises a spring 13 that is attached to the rod 11 in a position such that when a force is applied by the lever to the master cylinder 14, this force is transmitted via the spring from the lever to the master cylinder. The spring 13 creates a buffer, as will be explained further in detail hereunder, in the transmission of the force from the lever 9 to the master cylinder 14.

The master cylinder 14 is fluidly connected 15 to the brake cylinder 16. The master and the brake cylinder each comprise a cylinder housing and a piston that is provided to slide inside the cylinder housing. The cylinder housings of the brake and master cylinder preferably comprise a conduit 15 in between, and fluidly connecting the master cylinder housing with the brake cylinder housing. The diameters of the master cylinder 14 and the brake cylinder 16 can be identical, or can be different to adapt the force ratio between the master cylinder 14 and the brake cylinder 16. For example, when the master cylinder diameter 14 is smaller than the brake cylinder diameter 16, a first force applied to the master cylinder 14 will result in a second force at the brake cylinder 16, whereby the second force is higher than the first force. This principle is known to the skilled person and can be used to engineer a suitable brake mechanism. Preferably a fluid vessel 18 is further connected to the physically highest one of the master cylinder 14 and brake cylinder 16 so that air can be prevented from entering the conduit 15, the master cylinder 14 and brake cylinder 14. Because the brake cylinder 16 is connected to the master cylinder 14 via a conduit 15, a distance can be bridged between the braking location (at the brake cylinder) and the operating location (at the master cylinder 14). This allows the hydraulic brake system to be operated from any desirable place in the agricultural baler. Particularly a designer has the freedom to place the lever 9 and master cylinder 14 wherever it is comfortable for the operator of the agricultural baler.

The brake cylinder 16 is arranged in an engaging relation with an element 7 of the plunger drive mechanism. This element 7 can be a disc that is intentionally connected to the plunger drive mechanism for the purpose of stopping the latter. Alternatively, this element can be an element of the plunger drive mechanism such as the flywheel 2. FIG. 2 shows an example where the brake cylinder 16 acts on the disc 7 at one side of the disc 7. At the other side of the disc 7 a compensation block 17 is provided so that when the brake cylinder 16 acts on the disc 7, the disc 7 is caught between the compensation block 17 and the piston of the brake cylinder 16. Alternatively, the brake cylinder 16 can be formed with a dual brake cylinder structure, where two cylinders are arranged at opposing sides of the disc 7, to clamp the disc between the two cylinders of the dual structure brake cylinder 16. Such dual structure brake cylinder is illustrated in FIG. 1 with reference number 8. It will be clear that, where the disc 7 is allowed to rotate along with the plunger drive mechanism, the brake cylinder 16 is mounted at a predetermined position on the baler frame or the housing of the main drive gearbox such that frictionally engaging the brake cylinder (predetermined position) with the disc element 7 (rotatably mounted) tend to slow down the rotational movement of the disc element 7 thereby slowing down and eventually stopping the plunger drive mechanism.

Figure 3:
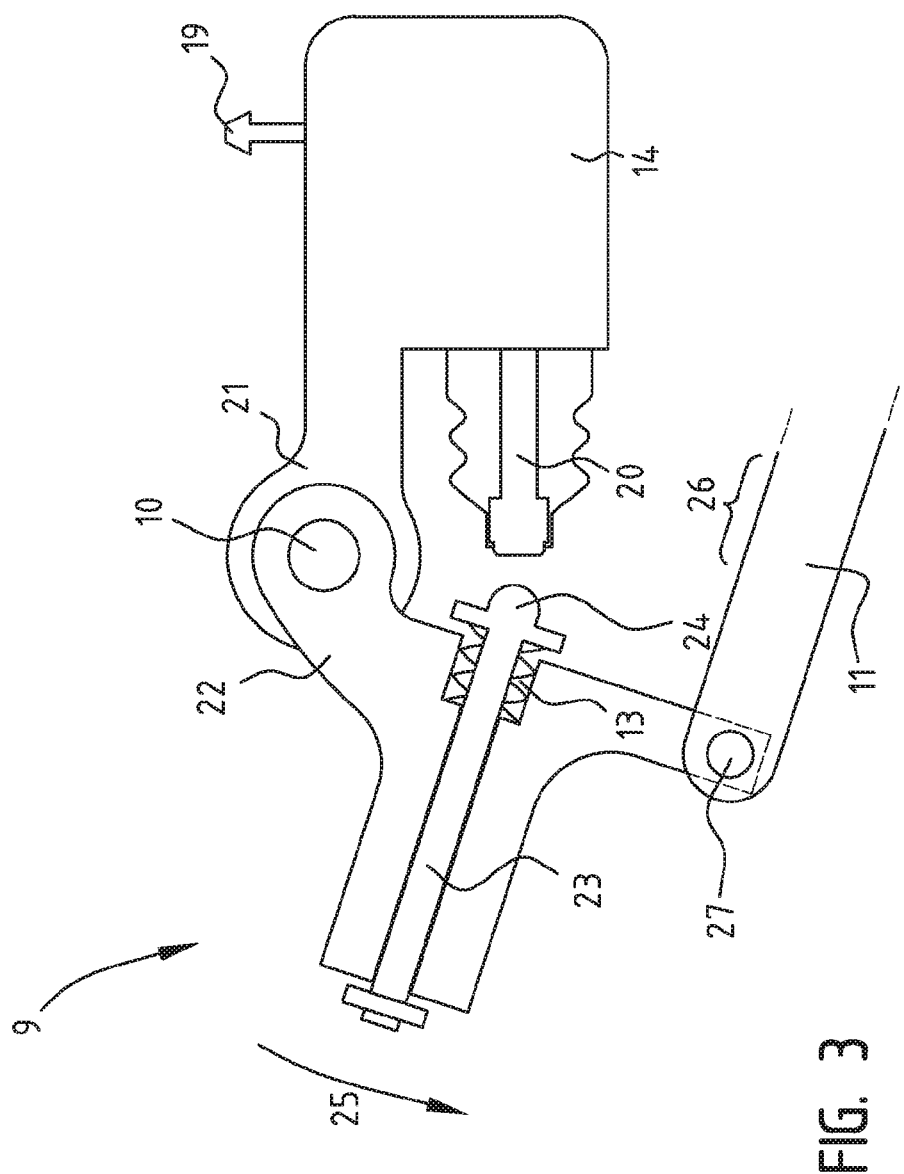
FIG. 3 shows an example of a lever according to the invention.

FIG. 3 shows a specific example of a lever 9. In the example of FIG. 3, the lever 9 is connected to the master cylinder 14. To this end, the master cylinder 14 housing comprises an extension 21 to which the lever 9 is rotationally connected via a hinge 10. Connecting the lever 9 directly to the master cylinder ensures a correct positioning of the lever with respect to the master cylinder. The master cylinder 14 further shows a rod 20 that is connected to the plunger of the master cylinder inside the master cylinder housing, which rod is positioned to allow easy operation of the master cylinder 14 via the lever 9. The master cylinder further comprises a first connection point 19 for connecting a conduit to the master cylinder housing and a second connection point for the pressure vessel 18.

Lever 9 comprises a compression pin 23 that is slidably mounted with respect to the lever housing 22. The compression pin 23 can slide between a forward position (in the FIG. 3, the compression pin is in the forward position when the compression pin is slid to the right hand side) and a backward position (in FIG. 3 the position that is obtained when the compression pump is slid to the left hand side). The compression pin 23 is biased towards the forward position via spring means 13. Where FIG. 2 shows the spring means as a spiral spring, FIG. 3 shows the spring means being formed of a combination of coned disc springs, also known as conical spring washers. The compression pin 23 comprises a head 24 that is provided to act on the master cylinder 14 by pushing against the rod 20.

In operation, the lever 9 can be moved into the braking position, such movement is in the figures illustrated with arrow 25 (movement of the intermediate element 22). Somewhere in an intermediate position of the lever 9, the lever will contact the master cylinder 14 via the spring 13 (or in the example of FIG. 3 via the compression pin 23). As from this intermediate position, further movement of the lever 9 will result on the one hand in an application of a force (and movement) to the master cylinder 14, and on the other hand in a compression of the spring means 13, such that when the lever reaches its final position, both the master cylinder 14 is actuated and the spring 13 is at least partially loaded. In this manner, operating the lever 9 will at least partially load the spring 13. The effect of the master cylinder being actuated, is that the brake cylinder then acts on the plunger drive mechanism (due to the fluid connection). When the brake mechanism is used as a parking brake, the braking force that is applied by the lever 9 via the spring 13 to the master cylinder 14 should be maintained over a longer period of time (several days, preferably several weeks). However, hydraulic systems such as the hydraulic system formed by the master cylinder 14, the conduit 15 and the brake cylinder 16 tend to leak fluid over time. Such leakage is minimal and negligible for short term braking operations (for example the operation of stopping a rotating plunger drive mechanism). However, considered over a longer period of time, this leak cannot be neglected and compromises the braking force. Particularly, due to leakage of fluid, the master cylinder plunger tends to move towards the brake cylinder plunger. A conventional lever (without a spring) cannot follow this movement of master cylinder plunger towards the brake cylinder plunger, and therefore the pressure applied to the master cylinder plunger decreases over time. In this manner, leakage will result in a decrease of braking force over time in a brake mechanism with a conventional lever.

The lever 9 with spring means 13 according to the invention, whereby the lever acts on the master cylinder via the spring 13 counters this effect. Namely when the master cylinder moves towards the brake cylinder due to leakage over time, the spring will tend to follow this movement (since energy is mechanically stored in the spring), thereby substantially maintaining the force that is applied to the master cylinder. In this manner, braking force can be kept high over a longer period of time. Braking force might still (theoretically) decrease due to spring properties, however this decrease is significantly smaller than in the case no spring is provided. Thereby, the spring means 13 create a mechanical buffer for buffering the movement of the master cylinder plunger towards the brake cylinder plunger over time. Therefore, according to the invention, the hydraulic brake mechanism can be used as a parking brake for the agricultural baler, since the braking force can be maintained over a longer period of time.

Although the spring between the lever and the master cylinder as described above is a preferred embodiment of the invention, other embodiments lead to the same effect. In another embodiment, the compression pin 23 is omitted, and a resilient element is integrated in the rod 11 (which in the example of FIG. 3 extends between the element 22 and a handle to transmit the handle rotation to the element 22), for example at the location 26. Such resilient element can be loaded by a pulling force applied to the rod via the handle, such that energy is accumulated in the resilient element in the rod. This energy is transmitted to the intermediate element 22 and thereby to the master cylinder 14. In this manner, energy is also mechanically accumulated.

A further example for accumulating energy is by forming the element 22 as a leaf spring between the hinge point 10 and the hinge point 27. Such leaf spring can accumulate energy and transmit the energy to the master cylinder 14. Alternatively, a hydraulic accumulator is integrated in the hydraulic system so that energy is accumulated by the hydraulic accumulator.

The above described embodiments and the shown figures are illustrative and serve only for a better understanding of the invention. The invention is not limited to the described embodiments. Different alternatives, and preferred features described in the text can be freely combined by the skilled person and developed in more detail to form an operational whole, without departing from the essence of the invention. The scope of protection of the invention will therefore be defined solely by the claims.

The invention claimed is:

1. Agricultural baler comprising
a baling chamber and a plunger, wherein the plunger is connected to a plunger driving mechanism that is adapted to reciprocally move the plunger in the baling chamber,
a hydraulic brake mechanism comprising a master cylinder, a brake cylinder and a lever, wherein the lever is provided to operate the master cylinder, the master cylinder is fluidly connected to the brake cylinder that is arranged to act on the plunger driving mechanism for braking the plunger driving mechanism,
wherein the hydraulic brake mechanism further comprises an accumulator operationally integrated in the hydraulic brake mechanism for accumulating and storing mechanical energy in the hydraulic brake mechanism, the accumulator is formed by a spring arranged between the lever and the master cylinder to transmit a compression from the lever to the master cylinder,
wherein the lever comprises a compression pin via which the lever is provided to act on the master cylinder, and wherein the compression pin is biased via said spring towards the master cylinder.

2. Agricultural baler according to claim 1, wherein the pin is slideable between a forward position and a backward position, wherein the spring is arranged to push the pin into the forward position.

3. Agricultural baler according to claim 1, wherein the lever comprises a rod pivotally connected to a pivot point at one end of the rod, and a handle at another end of the rod, and wherein the handle is operable between a retracted and an extended position.

4. Agricultural baler according to claim 3, wherein the rod cooperates with a ratchet mechanism that allows pivoting of the rod in only one direction.

5. Agricultural baler according to claim 3, wherein the compression pin is pressed against the master cylinder, thereby acting on the latter, when the lever is in the extended position.

6. Agricultural baler according to claim 5, wherein the spring is provided to be at least partially loaded by moving the lever from the retracted to the extended position, thereby pushing the pin against the spring tension, so that the pin is biased to press against the master cylinder in the extended position.

7. Agricultural baler according to claim 3, wherein the compression pin is disengaged from the master cylinder when the lever is in the retracted position.

8. Agricultural baler according to claim 1, wherein the plunger driving mechanism comprises a disk, said brake cylinder being arranged in an engaging relationship with said disk such that acting of the brake cylinder frictionally engages the brake cylinder with the disk.

9. Agricultural baler according to claim 1, wherein the plunger driving mechanism comprises a flywheel.

10. Agricultural baler according to claim 1, wherein the brake mechanism further comprises a conduit that extends between the master cylinder and the brake cylinder for fluidly connecting the brake cylinder.

11. Agricultural baler according to claim 1, wherein the brake cylinder has a diameter that is N times larger than a master cylinder diameter, wherein N is larger than 2.

12. Hydraulic brake mechanism in combination with an agricultural baler, the brake mechanism comprising:
a master cylinder,
a brake cylinder and a lever,
wherein the lever is provided to operate the master cylinder, the master cylinder is fluidly connected to the brake cylinder that is arranged to act on a plunger driving mechanism of the agricultural baler for braking the plunger driving mechanism, wherein the hydraulic brake mechanism further comprises an accumulator operationally integrated in the hydraulic brake mechanism for accumulating and storing mechanical energy in the hydraulic brake mechanism, and wherein the lever comprises a compression pin via which the lever is provided to act on the master cylinder, wherein the compression pin is biased via said accumulator towards the master cylinder.

* * * * *